(12) United States Patent
Micka et al.

(10) Patent No.: US 8,178,145 B1
(45) Date of Patent: May 15, 2012

(54) METHODS AND SYSTEMS FOR APPLYING SPROUT INHIBITORS AND/OR OTHER SUBSTANCES TO HARVESTED POTATOES AND/OR OTHER VEGETABLES IN STORAGE FACILITIES

(75) Inventors: Joel Micka, Kennewick, WA (US); Carlos Arias, Kennewick, WA (US)

(73) Assignee: JMC Enterprises, Inc., Kennewick, WA (US)

( * ) Notice: Subject to any disclaimer, the term of this patent is extended or adjusted under 35 U.S.C. 154(b) by 746 days.

(21) Appl. No.: 11/940,275

(22) Filed: Nov. 14, 2007

(51) Int. Cl.
*A23L 3/34* (2006.01)
*C12H 1/10* (2006.01)

(52) U.S. Cl. ........................ 426/321; 426/312

(58) Field of Classification Search .................. 427/446; 99/475, 476; 426/311, 321, 532, 418, 474, 426/312, 419, 310, 320, 322; 423/321, 312, 423/419, 310, 320, 322
See application file for complete search history.

(56) References Cited

U.S. PATENT DOCUMENTS

| | | | |
|---|---|---|---|
| 2,341,868 A | 2/1944 | Hitchcock et al. | |
| 2,347,265 A | 4/1944 | Hyman | |
| 2,435,056 A | 1/1948 | Schomer et al. | |
| 2,460,792 A | 2/1949 | Pabst et al. | |
| 2,510,839 A | 6/1950 | Schmidl | |
| 2,541,701 A | 2/1951 | Karmen | |
| 2,736,987 A | 3/1956 | Tomasovich | |
| 2,850,615 A | 9/1958 | Luse, Jr. et al. | |
| 2,894,845 A | 7/1959 | Stoddard | |
| 2,978,333 A | 4/1961 | Teigen | |
| 3,080,278 A | 3/1963 | Douros, Jr. et al. | |
| 3,113,875 A | 12/1963 | Prater et al. | |
| 3,128,170 A | 4/1964 | Plant | |
| 3,245,250 A | 4/1966 | Parks, Jr. | |

(Continued)

FOREIGN PATENT DOCUMENTS

GB    1035316    7/1966

(Continued)

OTHER PUBLICATIONS

Farm Energy Centre, "Controlling Condensation in Potato Stores", Jan. 1999, retrieved from the internet URL: http://www.fecservices.co.uk/DynamicContent/Documents/tech%20pubs/TN69%20Controlling%20condensation20in%20potato%20stores.pdf.*

(Continued)

*Primary Examiner* — Humera Sheikh
*Assistant Examiner* — Tynesha McClain-Coleman
(74) *Attorney, Agent, or Firm* — Perkins Coie LLP

(57) ABSTRACT

Methods and systems for applying CIPC and/or other sprout-inhibiting substances to post-harvest potatoes and/or other vegetables are disclosed herein. In one embodiment, a method of applying sprout inhibitor includes directing a first portion of an aerosol of the sprout inhibitor toward a top portion of a pile of potatoes, and then directing a second portion of the aerosol toward a bottom portion of the pile. In one aspect of this embodiment, directing the aerosol toward a top portion of the pile can include operating a facility fan at a flow rate of 6 SCFM or more in a first direction, and directing the aerosol toward a bottom portion of the pile can include operating the fan at a flow rate of 6 SCFM or more in a second direction, opposite to the first direction. In another aspect of this embodiment, the sprout inhibitor aerosol can include a mixture of CIPC and solvent (e.g., clove oil) that remains liquid at temperatures less than 105° F.

25 Claims, 6 Drawing Sheets

U.S. PATENT DOCUMENTS

| | | | |
|---|---|---|---|
| 3,339,475 A | 9/1967 | Martin |
| 3,357,201 A | 12/1967 | Toyama |
| 3,607,316 A | 9/1971 | Hume |
| 3,633,825 A | 1/1972 | Waldron |
| 3,742,094 A | 6/1973 | Kishino et al. |
| 3,788,066 A | 1/1974 | Nebgen |
| 3,857,511 A | 12/1974 | Govindan |
| 3,879,188 A | 4/1975 | Fritz et al. |
| 3,884,161 A | 5/1975 | Ankersen |
| 3,884,163 A | 5/1975 | Ankersen |
| 3,913,661 A | 10/1975 | Burg et al. |
| 3,949,733 A | 4/1976 | Miller et al. |
| 3,978,235 A | 8/1976 | Schiro |
| 4,078,480 A | 3/1978 | Luck |
| 4,113,175 A | 9/1978 | Sutton, Jr. |
| 4,148,926 A | 4/1979 | Baker et al. |
| 4,148,927 A | 4/1979 | Baker et al. |
| 4,154,656 A | 5/1979 | Maurer |
| 4,167,584 A | 9/1979 | Nelson |
| 4,200,657 A | 4/1980 | Cook |
| 4,208,192 A | 6/1980 | Quigley et al. |
| 4,216,238 A | 8/1980 | Baker et al. |
| 4,226,179 A | 10/1980 | Sheldon, III et al. |
| 4,241,871 A | 12/1980 | Newell, III et al. |
| 4,250,898 A | 2/1981 | Utsch et al. |
| 4,266,179 A | 5/1981 | Hamm, Jr. |
| 4,270,358 A | 6/1981 | Husain et al. |
| 4,291,617 A | 9/1981 | Miller et al. |
| 4,335,148 A | 6/1982 | Vidal et al. |
| 4,335,273 A | 6/1982 | Levin |
| 4,336,273 A | 6/1982 | Lee |
| 4,336,814 A | 6/1982 | Sykes et al. |
| 4,340,073 A | 7/1982 | de la Burde et al. |
| 4,351,849 A | 9/1982 | Meade |
| 4,377,599 A | 3/1983 | Willard, Sr. |
| 4,382,077 A | 5/1983 | Buchbinder |
| 4,388,892 A | 6/1983 | Rody et al. |
| 4,421,774 A | 12/1983 | Vidal et al. |
| 4,449,541 A | 5/1984 | Mays et al. |
| 4,479,079 A | 10/1984 | Hanner |
| 4,499,833 A | 2/1985 | Grantham |
| 4,532,156 A | 7/1985 | Everest-Todd |
| RE32,013 E | 10/1985 | de la Burde et al. |
| 4,568,019 A | 2/1986 | Browning |
| 4,570,532 A | 2/1986 | Labelle |
| 4,622,119 A | 11/1986 | Cerkanowicz et al. |
| 4,636,336 A | 1/1987 | Gay et al. |
| 4,637,296 A | 1/1987 | Hirosaki et al. |
| 4,651,072 A | 3/1987 | Takata |
| 4,668,435 A | 5/1987 | Grantham |
| 4,686,094 A | 8/1987 | Roberts et al. |
| 4,704,134 A | 11/1987 | Meyer et al. |
| 4,735,134 A | 4/1988 | Brouwer |
| 4,743,436 A | 5/1988 | Lyon |
| 4,772,315 A | 9/1988 | Johnson et al. |
| 4,778,517 A | 10/1988 | Kopatz et al. |
| 4,802,915 A | 2/1989 | Kopatz et al. |
| 4,814,612 A | 3/1989 | Vestal et al. |
| 4,823,679 A | 4/1989 | Robbins |
| 4,844,721 A | 7/1989 | Cox et al. |
| 4,849,192 A | 7/1989 | Lyon |
| 4,859,237 A | 8/1989 | Johnson et al. |
| 4,876,802 A | 10/1989 | Gergely et al. |
| 4,887,525 A | 12/1989 | Morgan |
| 4,894,452 A | 1/1990 | Stephan |
| 4,911,930 A | 3/1990 | Gergely et al. |
| 4,927,456 A | 5/1990 | Kopatz et al. |
| 4,960,992 A | 10/1990 | Vestal et al. |
| 4,977,825 A | 12/1990 | Morgan |
| 4,986,469 A | 1/1991 | Sutton, Jr. |
| 5,009,152 A | 4/1991 | Morgan |
| 5,041,245 A | 8/1991 | Benado |
| 5,084,187 A | 1/1992 | Wilensky |
| 5,129,951 A | 7/1992 | Vaughn et al. |
| 5,139,562 A | 8/1992 | Vaughn et al. |
| 5,156,747 A | 10/1992 | Weber et al. |
| 5,167,838 A | 12/1992 | Wilensky |
| 5,170,727 A | 12/1992 | Nielsen |
| 5,171,455 A | 12/1992 | Wang et al. |
| 5,244,866 A | 9/1993 | Tayler |
| 5,277,707 A | 1/1994 | Munk et al. |
| 5,306,350 A | 4/1994 | Hoy et al. |
| 5,360,554 A | 11/1994 | Sloan et al. |
| 5,376,045 A | 12/1994 | Kiser |
| 5,389,389 A | 2/1995 | Beck |
| 5,391,390 A | 2/1995 | Leo |
| 5,395,455 A | 3/1995 | Scott et al. |
| 5,436,226 A | 7/1995 | Lulai et al. |
| 5,505,875 A | 4/1996 | Beaujean et al. |
| 5,512,285 A | 4/1996 | Wilde |
| 5,601,865 A | 2/1997 | Fulger et al. |
| 5,622,912 A | 4/1997 | Riggle et al. |
| 5,635,452 A | 6/1997 | Lulai et al. |
| 5,711,211 A | 1/1998 | Ide et al. |
| 5,723,184 A | 3/1998 | Yamamoto |
| 5,811,372 A | 9/1998 | Riggle et al. |
| 5,918,537 A | 7/1999 | Forsythe et al. |
| 5,935,660 A | 8/1999 | Forsythe et al. |
| 5,965,489 A | 10/1999 | Forsythe et al. |
| 6,068,888 A | 5/2000 | Forsythe et al. |
| 6,171,561 B1 * | 1/2001 | Williamson et al. ......... 422/307 |
| 6,310,004 B1 * | 10/2001 | Forsythe et al. ............. 504/143 |
| 6,322,002 B1 | 11/2001 | Forsythe et al. |
| 6,541,054 B2 | 4/2003 | Forsythe et al. |
| 6,723,364 B1 | 4/2004 | Bompeix et al. |
| 2005/0137090 A1 | 6/2005 | Sardo |
| 2005/0288184 A1 | 12/2005 | Keim et al. |
| 2006/0270561 A1 | 11/2006 | Keim et al. |
| 2007/0290062 A1 | 12/2007 | Forsythe et al. |

FOREIGN PATENT DOCUMENTS

| | | |
|---|---|---|
| GB | 1054405 | 1/1967 |
| GB | 2250200 A * | 6/1992 |
| GB | 2347609 A | 9/2000 |
| NL | 1013911 | 6/2000 |
| NL | 1011571 A1 | 9/2000 |
| WO | WO-9509535 A2 | 4/1995 |

OTHER PUBLICATIONS

Corsini et al., "Changes in Chlorpropham Residues in Stored Potatoes," 1979 (no month), American Journal of Potato Research, vol. 56 No. 1, p. 43.*

Xu et al., "Modelling the Application of Chemicals in Box Potato Stores," 2000 (no month), Pest Managment Sciences, vol. 56, pp. 111-119.*

Moggia, Claudia et al., "Use of Thermofogging for DPA and Fungicides Applications in Chile", *Washington Tree Fruit Postharvest Conference*, Wenatchee, WA, Dec. 2-3, 2003, 2003 Proceedings, pp. 1-10.

Heinze, P. H. et al., "Further Tests with 3-Chloro-Isopropyl-N-Phenyl Carbamate as a Sprout Inhibitor for Potato Tubers", *American Potato Journal*, vol. 32, pp. 357-361, Jan.-Dec. 1955.

Wilson, J.B. et al., "Airflow Effect on Distribution of Isopropyl N-(3-Chlorophenyl) Carbamate (Chloro-IPC) Applied to Bulk Bins of Potatoes", *American Potato Journal*, vol. 42, No. 1, pp. 1-6, Jan. 1965.

Sawyer, R. L., "Relation of Chloro IPC for Potato Sprout Inhibition to Internal Sprouting of Potatoes", *American Potato Journal*, vol. 38. pp. 203-207, Jan.-Dec. 1961.

Sawyer, R.L. et al., "Vaporized Chemical Inhibitors and Irradiation, Two New Methods of Sprout Control for Tuber and Bulb Crops", *Proceedings of the American Society for Horticultural Science*, Jun. 1956, pp. 516-521, vol. 67, Published by The Society, Cornell University, Ithaca, NY.

Gray, Gleason et al., "Equipment for Chemical Treatment of Potatoes Moving Into Storage", *Research in the Life Sciences*, Jul. 1975, pp. 1-11, vol. 23, No. 3, Univeristy of Maine at Orono Life Sciences and Agriculture Experiment Station.

Bohl, William H. et al., "Variable Frequency Drive Fan Control for Potato Storage", *The Spudvine*, Nov. 2002, University of Idaho Extension, Blackfoot, ID.

*Techmark, Inc.'s Techlines*, 2002, No. 1, Techmark, Inc., Lansing, MI.

Keim, W. A., "Aerosol Formulations for Thermal Aerosol Generators", *Pesticide Formulations and Application Systems*, 1996, vol. 16. ASTM STP 1312, Michael J Hopkinson, Herbert M Collins, G. Robert Goss, Eds., American Society for Testing and Materials.

Lewis, M.D. et al., "Dimethylnapthalene and Diisopropylnaphthalene for Potato Sprout Control in Storage: 1. Application Methodology and Efficacy", *American Potato Journal*, 1997, pp. 183-197, vol. 74.

Hirnyck, Ronda, et al., "Pest Management Strategic Plan for Pacific Northwest Potato Production—Revision", Jul. 13, 2007, Summary of a workshop held on Jan, 26, 2006, Western Integrated Pest Management Center, Pocatello, ID.

Duke, Russell A., *Chemical Sampling of Puff and Leco Chlorpropham Application Processes*, Jun. 13, 1995, Prepared for Larry Koppes Vegetable Storage Controls.

Allen, John P. C., el al., "A New Cost Effective Variable Frequency Drive for Centrifugal Loads", *Conference Record Industry Applications Society IEEE-IAS-1983*, Eighteenth Annual Meeting of the IEEE Industry Applications Society, Oct. 3-7 1983, IEEE Catalog No. 83 CH1900-0, Library of Congress No. 80-640527.

Cuffe, Stafford S. et al., "A Variable Frequency AC Blower Drive Installation for Efficient and Accurate Control of Glass Tempering", *IEEE Transactions on Industry Applications*, pp. 1047-1052, Jul.-Aug. 1985, vol. IA-21, No. 4.

Forbush, T.D. et al., "Sensing, Monitoring and Controlling Potato Storage Environments—A Process Report", For presentation at the 1987 Summer Meeting of the American Society of Agricultural Engineers, Baltimore Convention Center, Baltimore. MD, Jun. 28-Jul. 1, 1987.

Toshiba Transistorized PWM Inverter VF Pack-P1, 230V/460VClass 1-88kVA, Technical Data, Jan. 1987.

ABB ACS550 adjustable speed AC drive User's Manual, Diablosport Revision Update Instructions, publicly available Nov. 14, 2006.

Hanson, B. et al., "Performance of Electric Irrigation Pumping Plants Using Variable Frequency Drives", *Journal of Irrigation and Drainage Engineering*, May-Jun. 1996, pp. 179-182, vol. 122, No. 3, American Society of Civil Engineers Water Resources Engineering Division.

Hanson, B. et al., "Variable-Frequency Drives for Electric Irrigation Pumping Plants Save Energy", *California Agriculture Magazine*,. Jan.-Feb. 1996, pp. 36-39, vol. 50, No. 1, University of California, Oakland, CA.

Scholey, Douglas, "Induction Motors for Variable Frequency Power Supplies", *IEEE Transactions on Industry Applications*, Jul.-Aug. 1982, pp. 368-372, vol. IA-18, No. 4.

Urano, A.S. et al., "System Benefits and Considerations when AC Adjustable-Frequency Drives in Generating Stations", *Proceedings of the American Power Conference*. 1981, pp. 515-528, vol. 43, Illinois Institute of Technology, Chicago, IL.

Connors, Dennis P. et al., "Considerations in Applying Induction Motors with Solid State Adjustable Frequency Controllers", Oct. 3-7 1983, IEEE Paper No. PCI-82-2, Reliance Electric Company, Cleveland, OH.

Energy-Efficient Electric Motors: Their Control and Application Symposium Proceedings, Feb. 23, 1983, Bonneville Power Administration, Portland, OR.

Helmke, Dennis R., "A-C Adjustable Frequency Motor Control for Process Pumping Systems". *Instrumentation in Food, Water, and Wastewater Industries: Instrumentation for People*, May 1980, pp. 39-43, programmed by ISA's Industries & Sciences Department's Divisions-Food Industry , Water and Wastewater Industries, © ISA 1980, ISBN: 87664-472-8.

Johnson, G.A., "A Retrofit Accomplishment: From Constant Air to Variable, Alternative Airflow Control Techniques and Variable Speed Drive Help Convert Single-Zone Constant Volume to Single-Zone Variable Air Volume System", *Ashrae Journal*, Jan 1985, pp. 106-114, vol. 27, No. 1, ISSN-0001-2491, © 1985 by the American Society of Heating, Refrigerating and Air Conditioning Engineers, Atlanta, GA.

McClung, Bruce L., "A Closer Look at Adjustable Frequency Alternating Current Variable Speed Drive Systems". *Proceedings of the First Annual Control Engineering Conference: held as Part of the Control Engineering Conference*, 1982. pp. 169-171, published by Control Engineering.

Papez. J.S., "Adjustable Flow with Adjustable Frequency", *Power Transmission Design*, Nov. 1978, pp. 58-62, vol. 19, No. 11, ISSN 0032-6070, © Penton/IPC, Inc., Cleveland, OH.

"Adjustable-Speed Drives for When the Cows Come Home", *Power Transmission Design*, Nov. 1978, pp. 58-62, vol. 19, No. 11, ISSN 0032-6070, © Penton/IPC, Inc., Cleveland, OH.

Selke, Gregory H., "Future Trends in Applications and Marketing of Adjustable Frequency A.C. Motor Drives", *Proceedings of the Third Annual Control Engineering Conference*. Held as part of the Control Engineering Conference and Exposition, Rosemont, IL, May 22-24, 1984, pp. 83-88, © 1984 by the Technical Publishing Company.

Solowjow, Alex O., "Variable Fan-Speed Control . . . A Simple and Effective Method for Reducing Plant Energy Costs", *Plant Engineering*, Jan. 23, 1986, pp. 55-57, vol. 40, No. 2, ISSN 0032-082X, © 1986 by Technical Publishing, Barrington, IL.

Stringer, Loren F., "Synchonous Motor Adjustable Frequency Drive Systems for Large Mechanical-Draft Fans", *Proceedings of the American Power Conference*, 1980, pp. 488-500, vol. 42, ISSN UU97-2126, Illinois Institute of Technology, Chicago, IL.

Tallant, Dennis, "Fanning the Cost of Energy" *Telephone Engineer & Management*. Feb. 15, 1981, pp. 100-104.

Yost, John C., Jr et al., "Experiences with Adjustable Frequency Fan Drives". *Proceedings of the 1983 16th Annual Frontiers of Power Conference*, Oct. 10-11, 1983, pp. III-1-III-4, Oklahoma State University, Stillwater, OK.

Graves, Bruce, "The Selection and Application of NEMA Frame Motors for Use with Adjustable Frequency Drives", *Conference Record of 1984 Annual Pulp and Paper Industry Technical Conference*, Jun. 19-22, 1984, ISSN 0190-2172, © 1984 by the Institute of Electrical and Electronics Engineers, Inc.

Salyani, M. et al., "Deposition Efficiency of Different Droplet Sizes for Citrus Spraying", *Transactions of the ASAE*, Nov.-Dec. 1987, pp. 1595-1599, vol. 30, No. 6, © 1987 American Society of Agricultural Engineers.

Morgan, Charlie, "Using Technology to Reduce Sprouting", *Potato Grower of Idaho*, publicly available Nov. 14, 2006, pp. 6-7.

Keim, W.A., Sprout Nip Aerosol Application Field Handbook, Apr. 7, 1987.

Kim, Mie-Soon Lee et al., "Effects of Chloropropham (CIPC) on Sprouting of Individual Potato Eyes and on Plant Emergence". *American Potato Journal*, 1972, pp. 420-431. vol. 49.
Corsini, Dennis et al., "A Simplified Method for Determining Sprout-Inhibiting Levels of Chlorpropham (CIPC) in Potatoes", *Journal of Agricultural Food Chemistry*, 1978. pp. 990-991. vol. 26, No. 4, Published by the American Chemical Society.
Roemhildt, David, "Sprout Inhibiting: New Product Reduces Tuber Stress", *Potato Country*, Sep. 1995, pp. 14-15.
Rastovski, A. et al., "Sugars and Starch During Tuberization, Storage and Sprouting", *Storage of Potatoes Post-Harvest Behavior, Store Design, Storage Practice, Handling*, 1981, pp. 82-96. Centre for Agricultural Publishing and Documentation, Wageningen.
LECO Potato Fogger Fog Generator Instruction Manual and Parts List, © 1989. 1992. Lowndes Engineering Co., Inc., Valdosta, GA.
Allen, Rich, "Frequency Drives Work, Evaluating Their Use for Potato Storage", *Spudman*, Jul. 1996, pp. 39-40.
Helmick, C. G., "Applying the Adjustable-Frequency Drive". *EC&M*, Sep. 1987, pp. 59-63.
Morton, Robert D. et al., "Evaporator Fan VFD Effects on Energy and Fruit Quality", publicly available Nov. 14, 2006, Cascade Energy Engineering.
"Potato Storage Research Shows Promise for Boosting Grower Profits". *AgKnowledge*. #169. publicly available Nov. 14, 2006, University of Idaho College of Agricultural and Life Sciences.
Koski, Steve, "VFD Application in Onion Storages", *Onion Storage VFDs*, revised May 20, 2003, pp. 1-2, Cascade Energy Engineering.
Oberg, Nathan A., et al., "Impact of Ventilation System Operation on Stored Potato Quality, Shrinkage and Engery Use Efficiency", Presented at the Idaho Potato Conference on Jan. 22, 2003.

*Potato Fan VFDs 'Can VFDs Boost My Bottom Line?'*, publicly available Nov. 14, 2006, published with support from the University of Idaho, Northwest Energy Efficiency Alliance, and Cascade Energy Engineering.
"Ventilation Systems", *Potato Storage*, 1983, pp. 14-18.
*Cornercroft Typhoon Storage Systems*, sales pamphlet, publicly available Nov. 14, 2006.
*Potato Fan VFDs Phase 1 General Report*, revised May 23, 2002, prepared by Cascade Energy Engineering, Inc., Walla Walla, WA.
Koski, Steve et al., *Potato Fan VFDs Phase 2 Report*, Oct. 2003, prepared for Northwest Energy Efficiency Alliance, Portland, OR.
"Talking Point", *Potato Storage International*, Mar. 2005, pp. 10-12.
*Aerosol Grade Sprout Nip 7A Directions for Use*, publicly available Nov. 14, 2006, PPG Industries.
Pin Nip 7A Aerosol Grade Potato Sprout Inhibitor Directions for Use, publicly available Nov. 14, 2006, Pin Nip, Inc., Boise, ID.
Clean Crop Sprout Nip 7 Aerosol Precautionary Statements and Directions, publicly available Nov. 14, 2006, Platte Chemical Co., Greeley, CO.
Pin Nip® 98.6% Chlorpropham Aerosol Grade Potato Sprout Inhibitor Directions for Use, publicly available Nov. 14, 2006, Pin Nip, Inc., Boise, Id.
*Get More Than Sprout Control 1,4 Sight™*, publicly available Nov. 14, 2006. D-I-1-4, Inc , Meridian, ID.
*Sprout Torch™ Potato Sprout Exterminator*, Label Sample, transmitted via fax Mar. 11, 2005, 1,4GROUP, Inc., Meridian, ID.
DECCO 271 Aerosol, Product Lable, publicly available Nov. 14, 2006, ELF Atochem North America, Inc., Monrovia, CA.
"DECCO 271 Aerosol Potato Sprout Inhibitor", *Directions for Use*, publicly available Nov. 14, 2006, Cerexagri Inc., Monrovia, CA.
*CIPC 98A Aerosol Grade Potato Sprout Inhibitor*. Product Label, publicly available Nov. 14, 2006, Aceto Agricultural Chemicals Corporation, Lake Success, NY.
*Talk Tips for 1,4SHIP®*, publicly available Nov. 14, 2006, D-I-1-4, Inc.
"Product Showcase", *Potato Storage International*, Jun. 2005, pp. 36-37.
Olsen, Nora et al., *Biox-C 2004 Research Summary*, publicly available Nov. 14, 2006, University of Idaho, Kimberly, ID.
Kleinkopf, Gale et al., "Progress Report Project BJ-K912", *Methods for Sprout and Disease Suppression of Potatoes in Storage*, publicly available Nov. 14, 2006. UI Kimberly R&E, Kimberly, ID.
Kleinkopf, Gale et al., "Progress Report for Project BJ-K812", *Methods for Sprout and Disease Suppression of Potatoes in Storage*, publicly available Nov. 14, 2006, UI Kimberly R&E, Kimberly, ID.
"Biox-C A Natural Sprout Inhibitor", *Information and Directions for Use*, publicly available Nov. 14, 2006, JMC Enterprises, Inc., Kennewick, WA.
*Sample Application Program-Norkotah, Ranger, or Chipper*, publicly available Nov. 14, 2006, One Four Group, Meridian, ID.
*1,4SIGHT Aerosol Grade—Potato Dormancy Enhancer*, Sample Label, publicly available Nov. 14, 2006, D-I-1-4, Inc., Meridian, ID.
Frazier, Mary Jo et al., *Clove Oil for Potato Sprout and Silver Scurf Suppression in Storage*. Presented at the Idaho Potato Conference on Jan. 19, 2006, University of Idaho.
1.4SHIP® Controls Peeps and Sprouts while Extending Shelf Life, publicly available Nov. 14, 2006, D-I-1-4, Inc., Meridian, ID.
*Relief for Sprouting and Pressure Bruise*, publicly available Nov. 14, 2006, One Four Group. Meridian, ID.
"New Product 'Vaporizes' Sprouting Problems", *Industry News*, publicly available Nov. 14, 2006, D-I-1-4, Inc., Meridian, ID.
"New Product 'Vaporizes' Load Rejection Problems", *Industry News*, publicly available Nov. 14, 2006, D-I-1-4, Inc., Meridian, ID.
"Storage Chemicals Prove Answer for Challenge", reprinted from *Potato Grower Magazine*, Jan. 2003, vol. 32, No. 1.
"The Legend® 1,4 SIGHT® Applicator", *User Guide*, publicly available Nov. 14, 2006. D-I-1-4, Inc., Meridian, ID.
*1,4SIGHT Aerosol Grade—Potato Dormancy Enhancer*, Product Label, publicly available Nov. 14, 2006, D-I-1-4, Inc., Meridian, ID.
*1,4SIGHT® The New World of Enhancing Potato Dormancy*, Jul. 30, 1998—Pasco, WA, Aug. 5, 1998—Merrill, OR.

1,4SIGHT® A Revolutionary Potato Dormancy Enhancer for Sprout Control, publicly available Nov. 14, 2006, D-I-1-4, Inc., Meridian, ID.
*PIN NIP® Enjoy Solid Success in Sprout Control Technology*, publicly available Nov. 14, 2006, PIN/NIP, Inc., Meridian, ID.
"Amplify™ Aerosol Grade Potato Sprout Inhibitor", *Directions for Use*, publicly available Nov. 14, 2006, Platte Chemical Co., Greeley Co.
*Grow Profits Not Sprouts*, © 2004 Aceto Agricultural Chemical Corporation.
*AMPLIFY™ Sprout Inhibitor*, product label, approved Sep. 28, 1999, Platte Chemical Co., Greeley, CO.
"DECCOSOL 408 An Adjuvant", *Handling and Storage Precautions*, publicly available Nov. 14, 2006, CEREXAGRI Inc., Monrovia, CA.
"Decco 273 Aerosol Potato Sprout Inhibitor", *Product Data*, reviewed by State of California Department of Pesticide Regulation Aug. 30, 1995, ELF Atochem North America, Inc., Monrovia, CA.
Kupferman, Eugene et al., "Managing Storage Scald in Anjou Pears", *Final Project Report WTFRC Project No. PR-06-603*, publicly available after Jan. 4, 2007, Washington State University Tree Fruit Research and Extension Center, Wenatchee, WA.
Bucarey, Elizabet Carla Rosa Rosales, "Eficacia de Aplicación de los Fungicidas Fludioxonil, Thiabendazole y Pyrimethanil por Termonebulización ("Thermofogging") en Manzanas Red Delicious Sobre el Control de Botrytis Cinerea en Postcosecha", publicly available Nov. 14, 2006, Universidad de Talca, (English Abstract Attached).
Alvear, Sylvana de los Ángeles Soto, "Evaluación Dela Aplicación en Postcosecha del Funguicida 'Pyrimethanil' Via Termonebulización en el Control de Botrytis Cinerea en Manzana CV. Fuji", publicly available Nov. 14, 2006, Universidad de Talca, (English Abstract Attached).
*Agricultural Chemical Usage Postharvest Applications-Oats and Potatoes Summary*, Mar. 2007, United States Department of Agriculture, National Agricultural Statistics Board.
*Agricultural Chemical Usage Postharvest Applications—Apples and Potatoes*, May 1998, United States Department of Agriculture, National Agricultural Statistics Service.
Announcing "Puff" Superior Sprout Inhibiting Application Technology from VSC, Feb. 23, 2005, Vegetable Storage Controls.
*DECCO 271 Aerosol Potato Sprout Inhibitor*, Sample Precautionary Statements and Directions for Use, publicly available Nov. 14, 2006, Cerexagri Inc., Monrovia, CA.
"Xedazole Aerosol (TBZ)", *Product Data Sheet*, Mar. 6, 1999, revised Jun. 4, 2006, Xeda International, France.
"Xedol Aerosol (OPP)", *Product Data Sheet*, May 15, 2001, revised Sep. 29, 2005, Xeda International, France.
"Biox Aerosol", *Product Data Sheet*, Jun. 15, 1999, revised Mar. 18, 2005, Xeda International, France.
"Xedamine Aerosol 88 (DPA)", *Product Data Sheet*, Jun. 14, 2000, revised Apr. 4, 2006, Xeda International, France.
"Xedaquine Aerosol (Ethoxyquin)", *Product Data Sheet*, Dec. 12, 1997, revised Apr. 6, 2006, Xeda International, France.
"Mint Oil". *Product Data Sheet*, Oct. 7, 2004, revised Mar. 15, 2005. Xeda International, France.
"Xeda O (OPP)", *Product Data Sheet*, Jun. 14, 1999, revised Mar. 15, 2005, Xeda International, France.
"Xedaril D", *Product Data Sheet*, Nov. 11, 2004, revised Mar. 16, 2005, Xeda International, France.
*Biox-C A Natural Sprout Inhibitor*, Sep. 2003, JMC Enterprises, Inc., Kennewick, WA.
DeEll, Jennifer, "Research Updates from the 9th International Controlled Admosphere Research Conference", Aug. 15, 2005, Ontario Ministry of Agriculture Food and Rural Affairs, accessed Sep. 25, 2008 <http://www.omafra.gov.on.ca/english/crops/hort/news/orchnews/2005/on_0805a9.htm>.
"Thermofogging Has Arrived!" Sep. 2005, Pace International, accessed Sep. 25, 2008, <http://www.paceint.com/news.asp?newsid=9>.
*Good Fruit Grower*, 2008, Issue 11, Good Fruit Magazine: Postharvest, accessed Oct. 12, 2008, <http://www.goodfruit.com/issues.php?article=329&issue=11>.

Moggia, C. et al., "Effect of DPA Reapplication by Thermofogging on Scald Control in Apples" (English Abstract), *Vicerrectoria Academica Direccion de Promamas de Investigacion, Journal No. 4, Universidad de Talca*, accessed Oct. 12, 2008, <ftp://colbum.utalca.cl/Documentos/Diat/jornadas_investigacion/jornada_4/4tajornada.pdf>.

Lemeronde, Corey. "VFDs Speed Production, Ease Maintenance for RMG/FELM Wire Processing Customers", *Drives Mag*, © 1997-2004 DrivesMag.com, accessed Aug. 2, 2004, <http://www.drivesurvey.com/index_library.cfm?feature_id=96>.

Wilcox, Marcus H. et al., "The Evaporator Fan VFD Initiative", *14th Annual Postharvest Conference*, Yakima, WA, Mar. 10-11, 1998, Washington State University Tree Fruit Research and Extension Center Postharvest Information Network, Wenatchee, WA.

Morton, Robert D. et al., "Evaporator Fan Variable Frequency Drive Effects on Energy and Fruit Quality", *16th Annual Postharvest Conference*, Yakima, WA, Mar. 14-15, 2000, Yakima, WA, Washington State University Tree Fruit Research and Extension Center Postharvest Information Network, Wenatchee, WA.

"Advanced Sprout Application Technology". Information Sheet, Publicly available Nov. 14, 2006, JMC Enterprises, Inc., Kennewick, WA.

"Welcome to XEDA Group Website", © 2004, accessed Aug. 8, 2008, <http://www.xeda.com/en/base.html>.

"Treatments by Fogging", XEDA International S. A. Virtual Market Place, accessed Aug. 8, 2008, <http://ww.virtualmarket.fruitlogistica.de>.

"XEDAMATE 60", *Product Data Sheet*. Oct. 24, 2004, revised Mar. 15, 2005, Xeda International, France.

"Thermal and ULV Fogging Equipment", Nixalite webpage, accessed Aug. 8, 2008, <http://www.nixalite.com>.

"Specialty Product List", Pace International Webpage, Pace International LLC, accessed Aug. 8, 2008, <http://www.paceint.com/products.asp?prodid=4>.

"XEDA Group Agencies", Jul. 15, 2008, Xeda Group webpage, <http://www.xeda.com/en/base.html>.

"XEDA Group Affiliates" Jul. 16, 2008, Xeda Group webpage, <http://www.xeda.com/en/base.html>.

"Variable Frequency Drives", JMC Ventilation Refrigeration, LLC, © 2005 JMC.

"Potato Fan VFDs" Cascade Energy Engineering website, accessed Apr. 11, 2003. <http://www.cascadeenergy.com/cee_tool.cfm?app=energy_potatovfd_main>.

"Potato Storage Research Facility", University of Idaho Extension, page revised Mar. 31, 2003, <http://www.kimberly.uidaho.edu/potatoes.>.

Environmental Protection Agency Application for Pesticide and Certification with Respect to Compliance with PR Notice 98-10, Product Name CIPC 98A, May 8, 2003.

Environmental Protection Agency Notice of Pesticide Registration, Decco 270 Aerosol, Aug. 8, 1995.

Process for Inhibiting Sprouting of Stored Potatoes, Preliminary Draft, Sep. 10, 1987.

Wilson, D. M., *Prairie Potato Council*, Feb. 15, 1983.

Professor Profile for Nora L. Olsen. Extension Potato Specialist and Associate Extension Professor, University of Idaho, Idaho Center for Potato Research and Education, accessed Nov. 27, 2007, <http://www.ag.uidaho.edu/potato/people/olsen.htm>.

Reregistration Eligibility Decision (RED) Letter for Chlorpropham, Environmental Protection Agency, Prevention, Pesticides, and Toxic Substances, Oct. 1996.

Burton. W.G., "Suppression of Potato Sprouting in Buildings", publicly available Nov. 14, 2006, pp. 299-305.

"Variable Frequency Drive", *Wikipedia*, accessed Jan. 11, 2008, <http://en.wikipedia.org/wiki/Variable-frequncy_drive>.

Letter from Mike Frelleson to All Applicators regarding University of Idaho Study, dated Dec. 21, 2004.

Pin Nip™ 98.6% Chlorpropham, Label and Directions for Use, Oct. 7, 1997.

Letter from Frank J. Dykas to Phil Hagenah, regarding Novelty Search Sprout Inhibitor, dated Feb. 24, 1988.

Letter from J.E. Jensen to W.R. Neilson, regarding Sprout Nip® 7A Research, dated Jul. 8, 1985.

"Speed Control of Fans During Application of Aerosol CIPC by Means of Frequency Adjustment of Fan Motor Supply Power", Apr. 15, 1988, Balivi Chemical Corporation. Boise, ID.

Letter from W.A. Keim to J.E. Jensen, regarding Sprout Nip Aerosol, dated May 22, 1985.

Office Action, U.S. Appl. No. 07/103,326, mailed Mar. 21, 1988.

Amendment, U.S. Appl. No. 07/103,326, filed Jun. 21, 1988.

Office Action, U.S. Appl. No. 07/103,326, dated Jun. 14, 1990.

Declaration of Joel Micka in Support of Defendants' Claim Construction Brief, Case No. 1:07-cv-00353-BLW, United States District Court for the District of Idaho, May 6, 2008.

*Problems in the Use of Sprout Inhibitors*, pp. 42-47, publicly available Nov. 14, 2006.

International Search Report, International Application No. PCT/US94/11419, issued Dec. 5, 1994.

Frazier, Mary Jo et al., "Organic and Alternative Methods for Potato Sprout Control in Storage," Univeristy of Idaho Extension, Idaho Agricultural Experiment Station, Sep. 2004, © 2004 University of Idaho.

Kleinkopf, Gale E. and Mary Jo Frazier, "Alternative Sprout Suppressants for Stored Potatoes," Idaho Potato Conference, Jan. 23, 2002.

* cited by examiner

START
↓
602 — LIQUEFY SOLID CIPC
↓
604 — COMBINE CLOVE OIL, BIOX-C, GLYCOL AND/OR OTHER SOLVENTS WITH LIQUID CIPC TO FORM CIPC MIXTURE THAT REMAINS LIQUID AT TEMPERATURES BELOW 105°F
↓
606 — TRANSPORT LIQUID CIPC MIXTURE TO VEGETABLE STORAGE FACILITY
↓
608 — APPLY AEROSOL OR FOG OF LIQUID CIPC MIXTURE TO VEGETABLES
↓
END

START
↓
702 — HEAT SOLID CIPC IN MELTING TANK TO FORM LIQUID CIPC
↓
704 — COMBINE CLOVE OIL, BIOX-C, PEPPERMINT OIL, EUCALYPTUS OIL, GLYCOL AND/OR OTHER SOLVENTS WITH LIQUID CIPC TO FORM LIQUID CIPC MIXTURE THAT REMAINS LIQUID AT TEMPERATURES BELOW 105°F
↓
706 — ALLOW LIQUID CIPC MIXTURE TO COOL
↓
708 — TRANSPORT LIQUID CIPC MIXTURE FROM MELTING TANK TO TRANSPORT CONTAINER ON TRAILER
↓
710 — TOW TRAILER TO VEGETABLE STORAGE FACILITY
↓
712 — AT STORAGE FACILITY, TRANSFER PORTION OF LIQUID CIPC MIXTURE FROM TRANSPORT CONTAINER TO PORTABLE CONTAINER
↓
714 — TRANSPORT PORTABLE CONTAINER TO AEROSOL-GENERATING DEVICE POSITIONED IN FLOW COMMUNICATION WITH STORAGE FACILITY
↓
716 — INTRODUCE CIPC MIXTURE INTO VEGETABLE STORAGE FACILITY WITH AEROSOL-GENERATING DEVICE OPERATING AT A TEMPERATURE LESS THAN 440°F
↓
END

METHODS AND SYSTEMS FOR APPLYING SPROUT INHIBITORS AND/OR OTHER SUBSTANCES TO HARVESTED POTATOES AND/OR OTHER VEGETABLES IN STORAGE FACILITIES

TECHNICAL FIELD

The following disclosure relates generally to methods and systems for applying sprout inhibitors to harvested potatoes and other vegetables in storage facilities.

BACKGROUND

Potatoes and other tubers are typically held in large storage facilities after harvest to maintain quality and provide a uniform flow of product to market. Modern storage facilities can hold more than 20,000 tons of potatoes in piles as high as 25 feet. Temperature and humidity must be controlled during storage to prevent excessive dehydration, decay, and the development of high sugar concentrations. Most table stock potatoes, for example, are typically stored at about 40-45° F. and about 95% relative humidity, while potatoes for chips or French fries are typically stored at about 45-55° F. and about 95% relative humidity.

Sprouting can be expected in most potatoes after a couple of months of storage. Although limited sprouting does not seriously damage potatoes for food purposes, heavily sprouted potatoes tend to shrivel and can be difficult to market. Accordingly, successful long-term storage generally requires the use of a sprout inhibitor in combination with proper storage conditions.

Isopropyl-N-chlorophenylcarbamate (CIPC) is a very effective post-harvest sprout inhibitor registered for use in the United States. CIPC has the consistency of solid paraffin wax at temperatures less than about 105° F., and it is typically sold in this form for ease of handling and storage. For application, solid CIPC is melted to form a liquid, and then applied to potatoes or other vegetables as an aerosol or emulsifiable concentrate. Clove oil (sometimes marketed as Biox-C), propylene glycol, methanol, and/or other solvents are often mixed with CIPC so that it remains liquid at ambient temperatures (e.g., temperatures less than about 105° F.) before application. Such CIPC mixtures typically contain about 78% or less of CIPC by weight, with the remainder of the solution consisting mostly of solvent.

U.S. Pat. Nos. 5,935,660 and 6,068,888 disclose methods for applying substantially pure CIPC aerosols to potatoes in storage facilities. More specifically, these patents disclose methods in which solid CIPC is melted in a heated reservoir to form liquid CIPC at the job site. The liquid CIPC is then conveyed through a heated and insulated conduit to an aerosol-generating device positioned next to the storage facility. The aerosol-generating device forms an aerosol of microscopic CIPC crystals, and directs the aerosol through a duct that extends into the storage facility. Large fans inside the storage facility drive the aerosol into a plurality of perforated ducts extending beneath the pile of potatoes. As the aerosol flows out of the perforations and moves upwardly through the pile of potatoes, the CIPC crystals are deposited on the potatoes.

The '660 and '888 patents cite a number of advantages to using substantially pure CIPC aerosols for potato treatment. For example, these patents note that solid CIPC is easy to handle and transport. In addition, they note that the use of substantially pure CIPC aerosols (as compared to, for example, CIPC mixed with alcohol solvents) eliminates the introduction of alcohol, alcohol combustion products, and/or alcohol decomposition products into the storage facility.

There are, however, a number of shortcomings associated with the methods described in the '660 and '888 patents. For example, these methods require a heated reservoir, a heated and insulated conduit, and other special equipment to maintain the molten CIPC at a temperature of at least 105° F. prior to and during application. Another shortcoming of this approach is that the CIPC crystals in the aerosol tend to collect on the fan blades and other surfaces of the air circulation system in the storage facility. As a result, a significant portion of the CIPC is wasted and ineffective. Furthermore, the CIPC buildup must be cleaned off the air handling equipment periodically.

U.S. Pat. No. 4,887,525 discloses a method of CIPC application that purportedly reduces the amount of CIPC waste. More specifically, this patent discloses the use of a frequency drive to reduce fan speed and slow the flow of CIPC aerosol to less than 5 Standard Cubic Feet per Minute (SCFM). Apparently, reducing the flow rate to less than 5 SCFM reduces the loss of sprout inhibiting chemical by agglomeration and impingement with the surfaces of the air handling system.

One shortcoming of the method taught by the '525 patent is that achieving an even distribution of CIPC throughout the potatoes is difficult with air flows of 5 SCFM or less. This difficulty is increased when the CIPC is mixed with clove oil or other solvents, because the resulting aerosol particles are heavier than CIPC alone. Another shortcoming of this approach is that it tends to increase the amount of time necessary to apply CIPC to stored potatoes.

BRIEF DESCRIPTION OF THE DRAWINGS

FIG. 6 is a flow diagram of a process for preparing and applying sprout inhibitor to potatoes and other post-harvest vegetables in a storage facility, in accordance with an embodiment of the invention.

FIG. 7 is a flow diagram of a process for preparing, transporting, and applying sprout inhibitor to potatoes and other post-harvest vegetables in a storage facility, in accordance with another embodiment of the invention.

DETAILED DESCRIPTION

Figure 1:
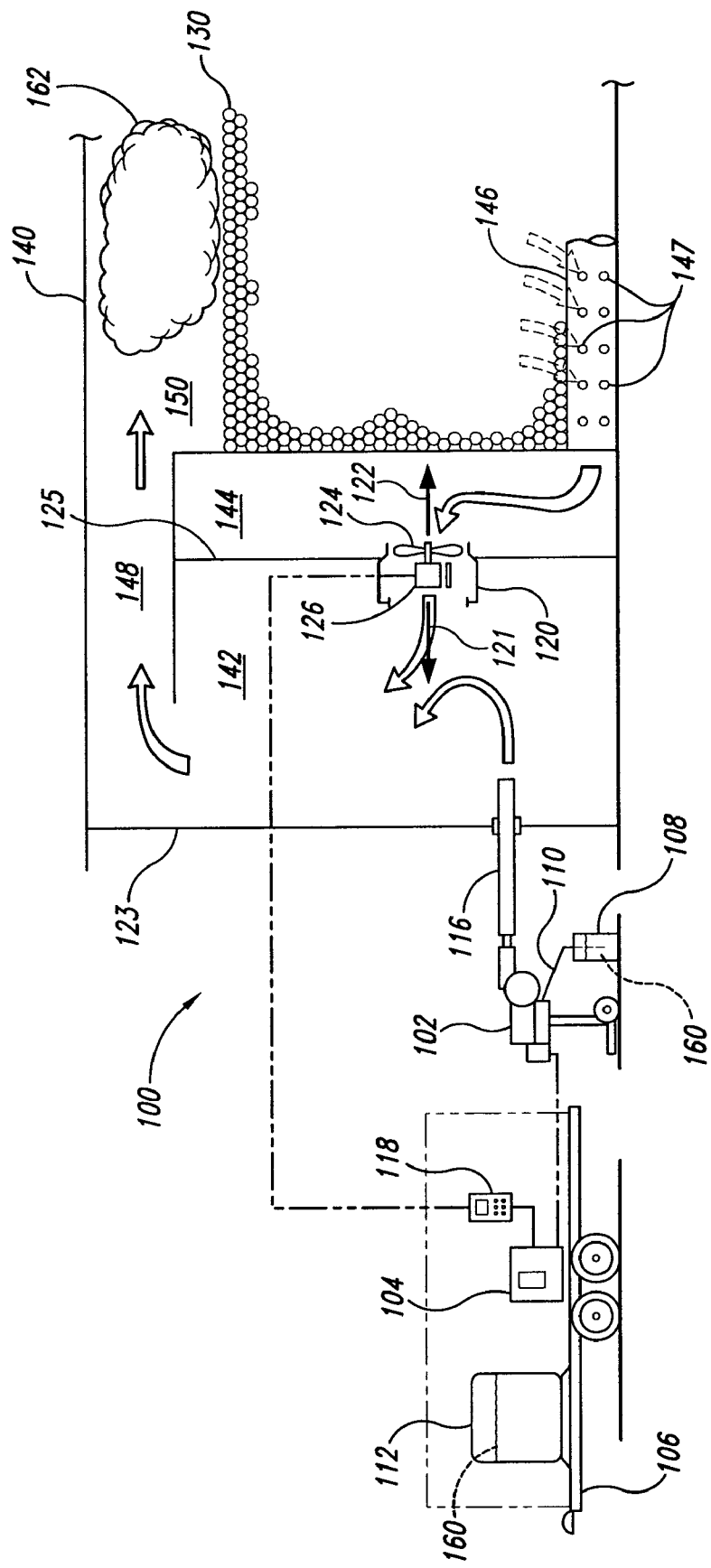
FIG. 1 is a schematic diagram of a sprout inhibitor application system in a first mode of operation at a potato storage facility, in accordance with an embodiment of the invention.

The following disclosure describes various embodiments of methods and systems for applying sprout inhibitors and/or other chemical and non-chemical substances to post harvest potatoes and/or other vegetables in storage facilities. In one embodiment, for example, a sprout inhibitor applicator melts solid CIPC into a liquid at his facility, and then mixes clove oil, glycol, and/or other solvents with the CIPC so that it will remain liquid at room temperature (e.g., about 60-75° F.). The applicator then transports the CIPC solution to a potato storage facility or other job site in liquid form. At the job site, the applicator applies the CIPC solution to the stored potatoes with a suitable aerosol-generating device.

In contrast to some CIPC application methods which call for air flow rates of 5 Standard Cubic Feet per Minute (SCFM) or less to avoid agglomeration losses, in this embodiment the applicator operates the storage facility fans at 6 SCFM or more. Furthermore, in one aspect of this embodiment described in greater detail below, the applicator can alter the direction of the facility fans at various time intervals to improve the distribution of aerosol throughout the stored potatoes. For example, in one embodiment the applicator can (1) operate the facility fans in a first direction for a first period of time to flow the aerosol into the air space above the pile of potatoes; (2) reverse the fans and operate them in the opposite direction for a second period of time to flow the aerosol into the perforated ducts extending beneath the potatoes; and (3) reverse the fans yet again and operate them in the first direction for a third period of time to again flow the aerosol into the air space above the potatoes. Reversing the facility fans and flowing the sprout inhibitor in opposite directions at flow rates greater than about 6 SCFM as described herein can improve the efficacy of sprout inhibitor applications on potatoes, onions and other post-harvest vegetables in bulk storage facilities.

Certain details are set forth in the following description and in FIGS. 1-7 to provide a thorough understanding of various embodiments of the invention. Other details describing well-known methods and systems often associated with the application of sprout inhibitors and other substances to post-harvest potatoes and other vegetables, however, are not set forth below to avoid unnecessarily obscuring the description of the various embodiments of the invention.

Many of the details, dimensions, angles and other features shown in the Figures are merely illustrative of particular embodiments of the disclosure. Accordingly, other embodiments can have other details, dimensions, angles and features without departing from the spirit or scope of the present disclosure. In addition, those of ordinary skill in the art will appreciate that further embodiments of the invention can be practiced without several of the details described below.

In the Figures, identical reference numbers identify identical, or at least generally similar, elements. To facilitate the discussion of any particular element, the most significant digits or digits of any reference number refer to the Figure in which that element is first introduced. For example, element 110 is first introduced and discussed with reference to FIG. 1.

FIG. 1 is a schematic diagram of a chemical application system 100 ("application system 100") in a first mode of operation, in accordance with an embodiment of the invention. In the illustrated embodiment, the application system 100 is applying an aerosol of sprout inhibitor to a pile of post-harvest potatoes 130 held in a storage facility 140. In other embodiments, however, the application system 100 can be used in accordance with the methods described herein to apply other types of chemicals and substances to potatoes, or to apply sprout inhibitor or other types of chemicals and substances to other types of post-harvest crops and vegetables, such as onions.

In one aspect of this embodiment, an over road trailer 106 carries a solution of sprout inhibitor 160 to the job site in a first container 112 (e.g., a 50-gallon tote). As described in greater detail below, the sprout inhibitor 160 can include a solution of CIPC, clove oil (Biox-C), CIPC mixed with clove oil, and/or other chemicals, solvents, etc. Prior to application, a portion of the sprout inhibitor 160 can be dispensed from the first container 112 into a smaller second container 108 (e.g., a 5 gallon bucket), which is then carried over to an aerosol-generating device 102 positioned next to the storage facility 140 (the aerosol-generating device 102 can also be transported to the job site in the trailer 106). In the illustrated embodiment, the aerosol-generating device 102 is an electric device that receives power from an electric generator 104 carried on the trailer 106. In other embodiments, however, the application system 100 can utilize other types of aerosol-generating devices known in the art including, for example, combustion-based devices that operate on gasoline, propane, and/or other combustible fuels.

During application, the aerosol-generating device 102 draws the sprout inhibitor 160 from the second container 108 via a flexible conduit 110 (e.g. a rubber tube or hose). The aerosol generator 102 is operably coupled to a supply duct 116 that extends through a side wall 123 of the storage facility 140. The supply duct 116 opens into a fan room 142 that communicates with at least one air mover 120. The air mover 120 includes an electric motor 126 that drives a plurality of fan blades 124. The motor 126 receives electric power from the generator 104 via a variable frequency drive 118 (VFD 118) positioned in the trailer 106. As described in greater detail below, the VFD 118 includes a user interface that enables an applicator (not shown) to control the speed and direction of the fan blades 124. More specifically, the applicator can control operation of the air mover 120 so that it can flow air in either a first direction 121 or a second direction 122 during application of the sprout inhibitor 160.

Figure 2:
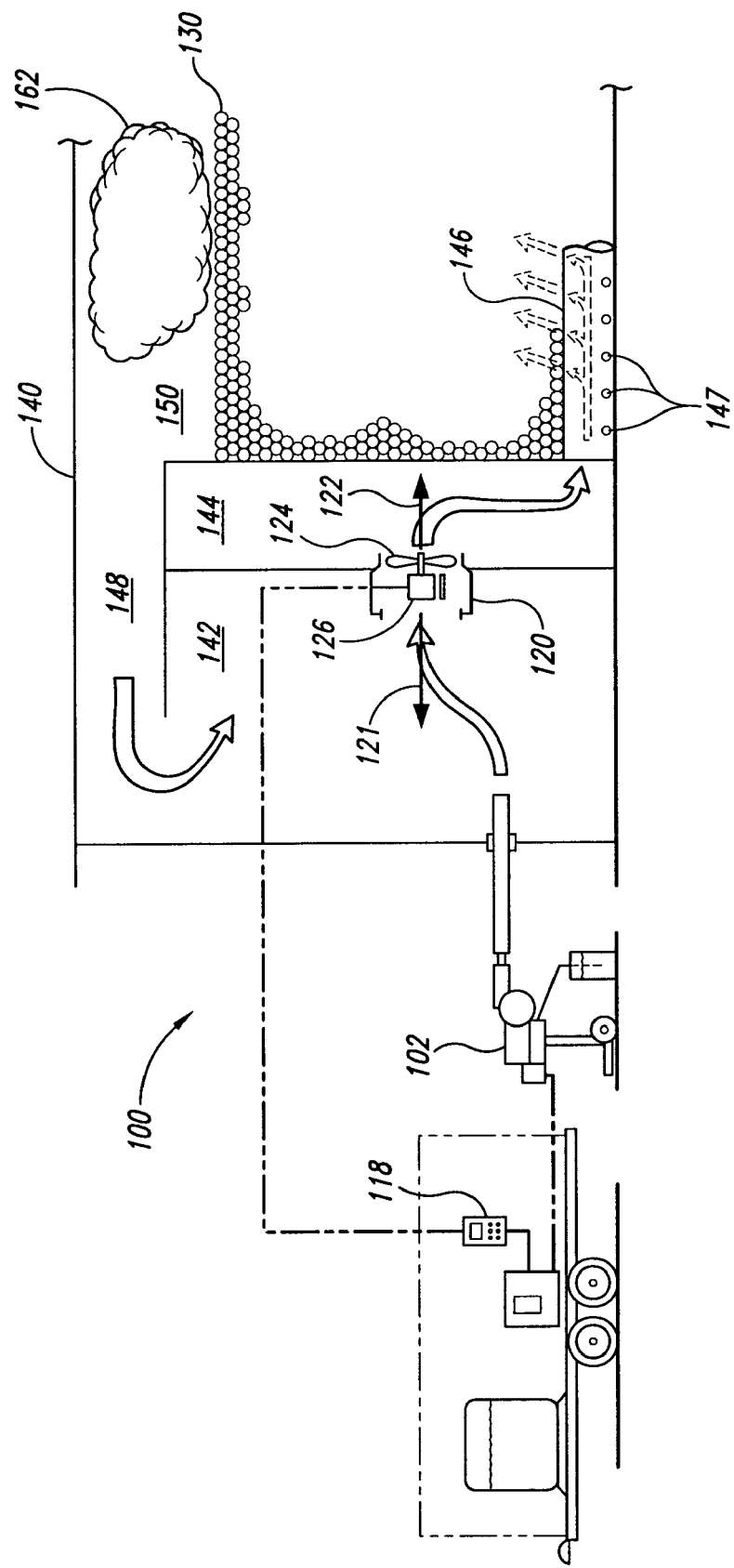
FIG. 2 is a schematic diagram of the sprout inhibitor application system of FIG. 1 in a second mode of operation at the potato storage facility.

In the illustrated embodiment, the air mover 120 is positioned on an interior wall 125 that separates the fan room 142 from a supply air plenum 144. The supply air plenum 144 communicates with one or more ducts 146 (e.g., culvert ducts) that extend beneath the pile of potatoes 130. Each of the ducts 146 includes a plurality of holes or perforations 147. The perforations 147 allow the air in the facility 140 to circulate downwardly through the pile of potatoes 130 when the air is flowing in the first direction 121. Conversely, as shown in FIG. 2, the perforations 147 allow the air to circulate upwardly through the pile of potatoes 130 when the air is flowing in the second direction 122.

The sprout inhibitor 160 can be applied to the potatoes 130 in a number of different ways in accordance with the present disclosure. In one embodiment, for example, the applicator fills the first container 112 with the required amount of sprout inhibitor 160 at his facility. The applicator then loads the first container 112 onto the trailer 106 along with the generator 104, the VFD 118, and the aerosol-generating device 102. The applicator then tows the trailer 106 to the job site. At the job site, the applicator unloads the aerosol-generating device 102 and couples the outlet of the device to the supply duct 116. The applicator fills the second container 108 with sprout inhibitor 160 from the first container 112, and positions the second container 108 next to the aerosol-generating device 102. The applicator then places the conduit 110 into the second container 108, and operably connects the aerosol-generating device to the generator 104. The applicator also connects the VFD 118 to the fan motor 126.

In one embodiment, the applicator begins the application process by operating the air mover 120 in the first direction 121. This is different than conventional methods of CIPC application, which typically only operate the fans in the opposite, second direction 122. Furthermore, in this embodiment the applicator adjusts the VFD 118 so that the air mover 120 operates at greater than 5 SCFM (e.g., from about 6 SCFM to about 10 SCFM). The applicator then turns the aerosol-generating device 102 "on." The aerosol-generating device 102 sucks the liquid sprout inhibitor 160 from the second container 108 and forms an aerosol. The aerosol-generating device 102 blows the aerosol through the supply duct 116 and into the fan room 142. The air mover 120 blows the aerosol in the fan room 142 through a return air plenum 148 and into a head space 150 above the potatoes 130. After a predetermined period of time, the head space 150 is "supercharged" with a relatively high density aerosol cloud 162. As described in greater detail below, supercharging the head space 150 in this manner can provide a more uniform distribution of sprout inhibitor over the potatoes 130, resulting in less chemical usage, greater efficacy, and lower costs.

The amount of time that the air mover 120 should be operated in the first direction 121 to sufficiently supercharge the head space 150 can vary depending on a number of different factors, including, for example, the quantity of potatoes in the pile 130, the size of the storage facility 140, the composition of the sprout inhibitor 160, weather conditions, etc. In one embodiment, for example, the air mover 120 can be operated in the first direction 121 for approximately 25% of the overall sprout inhibitor application time. For example, if the full dose of sprout inhibitor 160 is applied over a four hour period, the air mover 120 can be operated in the first direction 121 for a first time interval of about one hour. In other embodiments, however, the air mover 120 can be operated in the first direction 121 for other periods of time to suit the particular circumstances. Once the head space 150 is sufficiently filled with sprout inhibitor aerosol, the air mover 120 can be reversed so that it operates in the second direction 122, as described below with reference to FIG. 2.

FIG. 2 is a schematic diagram of the application system 100 in a second mode of operation, in accordance with an embodiment of the invention. In this embodiment, the applicator adjusts the VFD 118 so that the fan 120 reverses direction and drives the air flow in the second direction 122 at a rate greater than 5 SCFM (e.g., from about 6 SCFM to about 10 SCFM) while the aerosol-generating device 102 is operating. This moves the sprout inhibitor from the head space 150 and the aerosol-generating device 102 through the fan room 142 and into the supply air plenum 144. From the supply air plenum 144, the aerosol flows into the pile of potatoes 130 via the perforations 147 in the one or more ducts 146.

The amount of time that the air mover 120 should be operated in the second direction 122 can vary depending on a number of different factors, including, for example, the quantity of potatoes in the pile 130, the size of the storage facility 140, etc. In one embodiment, for example, the air mover 120 can be operated in the second direction 122 for approximately 50% of the overall sprout inhibitor application time. For example, if the full dose of sprout inhibitor 160 is applied over a four hour period, the air mover 120 can be operated in the second direction 122 for a second time interval of about two hours. In other embodiments, however, the air mover 120 can be operated in the second direction 122 for other periods of time to suit other factors.

After the air mover 120 has been operated in the second direction 122 for a predetermined suitable period of time, the applicator can again reverse the air mover 120 so that it drives the air flow in the first direction 121, as shown in FIG. 1. As in the first and second stages of operation described above, the air mover 120 can be operated in the first direction 121 for a third time interval that can vary depending on various factors associated with the particular job. For example, in one embodiment, the air mover can be operated in the first direction 121 for a third time interval of about 25% of the overall time of aerosol application. For example, if the full dose of sprout inhibitor 160 is applied over a four hour period, the air mover 120 can be operated in the first direction 121 for a third time interval of about one hour. In other embodiments, however, the air mover 120 can be operated in the first direction 121 for other periods of time to suit the particular application.

Thus, in the embodiments of the invention described above, sprout inhibitor aerosol is applied to a pile of stored potatoes by flowing the aerosol in a first direction toward the head space above the potatoes for a first period of time, reversing the flow of aerosol so that it flows beneath the pile of potatoes for a second period of time, and then reversing the flow of aerosol yet again so that it again flows toward the head space above the potatoes for a third period of time. In these embodiments, the air mover 120 operates at flow rates above 5 SCFM (e.g., flow rates of 6 SCFM or more) when the sprout inhibitor 160 is flowing into the storage facility 140. Furthermore, as FIGS. 1 and 2 illustrate, the sprout inhibitor 160 is introduced into the storage facility 140 downstream of the air mover 120 when the air mover operates in the first direction 121, and upstream of the air mover 120 when the air mover 120 operates in the opposite, second direction 122.

In other embodiments, however, various portions of the methods described above may be altered or omitted without departing from the spirit or scope of the present invention. For example, in other embodiments it may be advantages to change the direction of the air flow in the facility more than three times, or less than three times. In addition, it may be advantageous to start the flow in the second direction 122 first, and then change to the first direction 121, instead of vice verse. Furthermore, in some applications it may be advantageous to inject the sprout inhibitor into the air stream upstream of the air mover when the air mover operates in the first direction 121, and downstream of the air mover when the air mover operates in the second direction 122. As the foregoing illustrates, the present invention is not limited to the particular embodiments disclosed herein, but extends to other embodiments consistent with the present disclosure.

Figure 3:
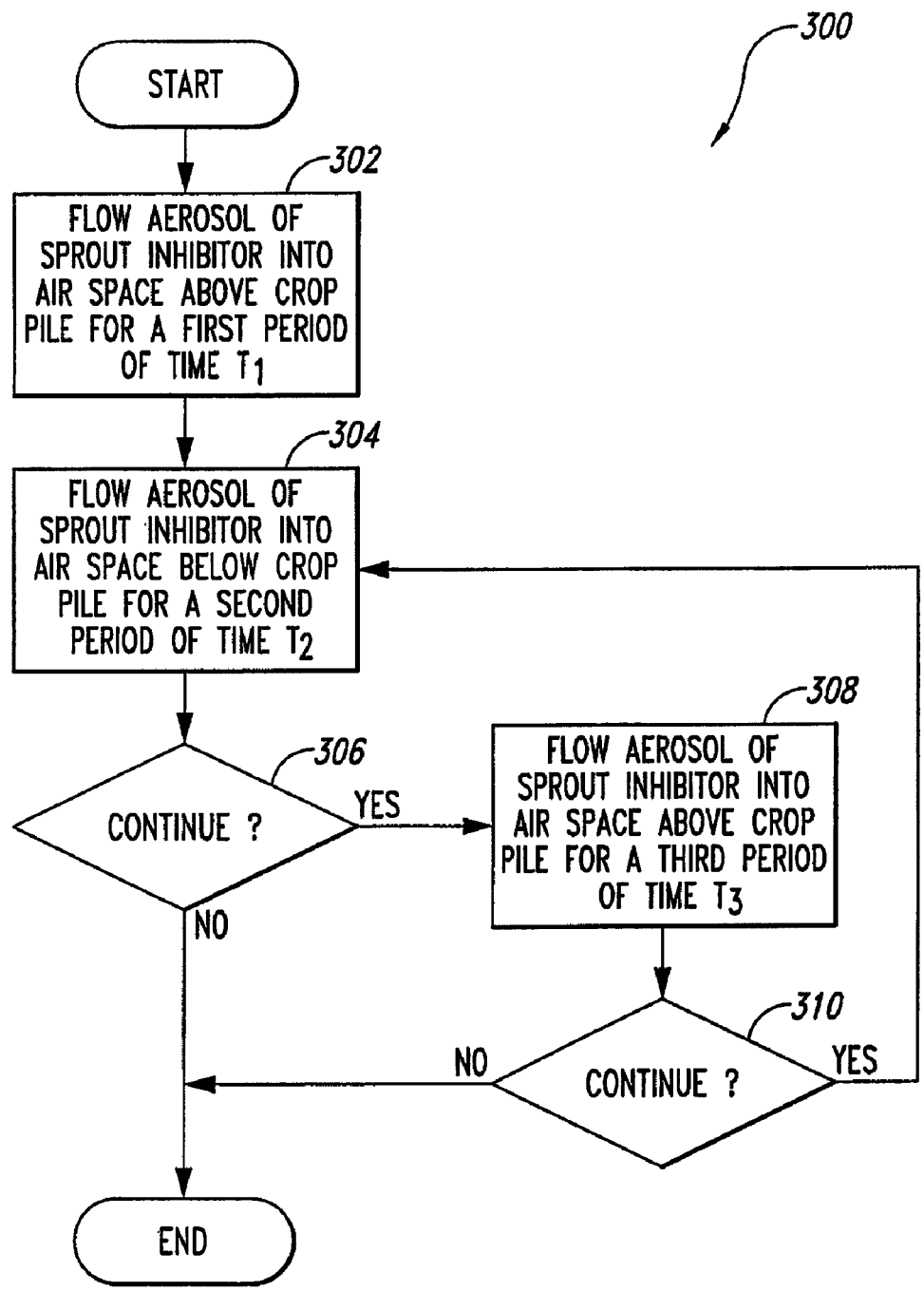
FIG. 3 is a flow diagram of a process for applying sprout inhibitor to potatoes and other post-harvest vegetables in a storage facility, in accordance with an embodiment of the invention.

FIG. 3 is a flow diagram of a method or process 300 for applying sprout inhibitor to stored potatoes and other vegetables in accordance with an embodiment of the invention. In one aspect of this embodiment, the process 300 can be carried out by an applicator using a sprout inhibitor application system that is at least generally similar in structure and function to the application system 100 described above with reference to FIGS. 1 and 2. In other embodiments, however, the process 300 can be implemented with other types of sprout inhibitor application systems and equipment.

In block 302, the applicator flows an aerosol of sprout inhibitor into the air space above a pile of crops (e.g., a pile of potatoes, onions, or other vegetables) for a first period of time $T_1$. In block 304, the applicator flows the aerosol into the air space below the crop pile for a second period of time $T_2$. In block 306, the applicator determines if it is necessary to continue the application process. For example, in some situations further applications of the aerosol may not be necessary due to the relatively small quantity of vegetables being treated, the size of the storage facility, etc. If the applicator determines that further application is not needed, the process 300 is complete. If not, the process 300 proceeds to block 308. In block 308, the applicator flows the aerosol of sprout inhibitor into the air space above the crop pile for a third period of time $T_3$. After block 308, the applicator again determines in block 310 if further applications of the aerosol are necessary.

If not, the process 300 is complete. Conversely, if additional applications are necessary, the process 300 returns to block 304 and repeats.

Figure 4:
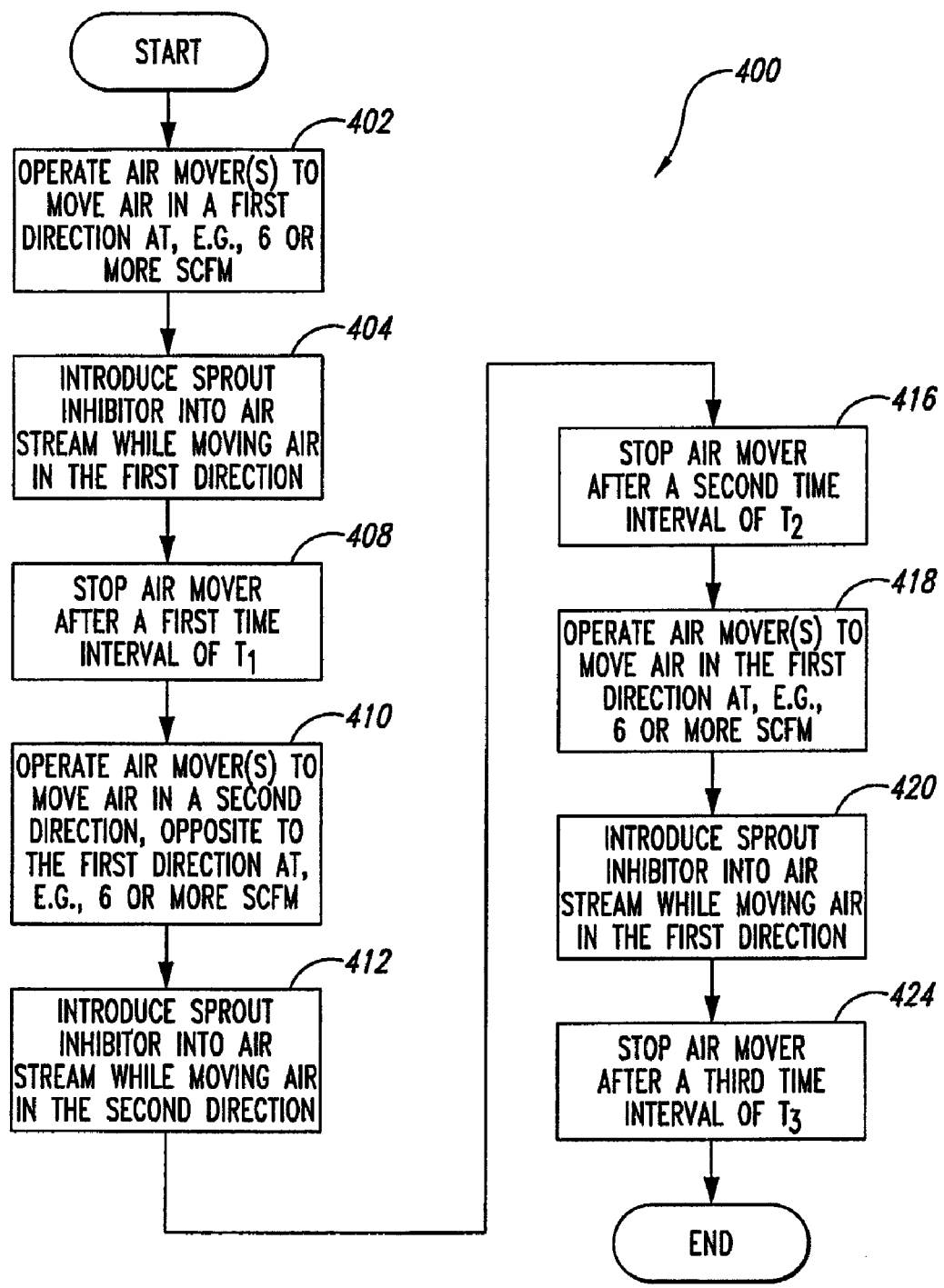
FIG. 4 is a flow diagram of another process for applying sprout inhibitor to potatoes and other post-harvest vegetables in a storage facility, in accordance with a further embodiment of the invention.

FIG. 4 is a flow diagram of a process 400 for applying sprout inhibitor to post-harvest potatoes and/or other vegetables in a storage facility, in accordance with another embodiment of the invention. As with the process 300 described above, the process 400 can be carried out by an applicator using a sprout inhibitor application system that is at least generally similar in structure and function to the application system 100 described above with reference to FIGS. 1 and 2. In block 402, the applicator operates the one or more air movers in the storage facility to move the air flow in a first direction at a flow rate of, e.g., about 6 or more SCFM. In block 404, the applicator introduces sprout inhibitor (e.g., as an aerosol) into the air stream while moving the air in the first direction. In block 408, after a first time interval $T_1$ (e.g., after about 25% of the total application time), the applicator stops the air mover.

In block 410, the applicator reverses the direction of the one or more air movers to move the air stream in a second direction, opposite to the first direction at, e.g., about 6 or more SCFM. In block 412, the applicator introduces sprout inhibitor into the air stream while moving the air in the second direction. In block 416, after a second time interval $T_2$ (e.g., after about 50% of the total application time), the applicator stops the air mover.

In block 418, the applicator again reverses the direction of the one or more air movers to once again move the air stream in the first direction at, e.g., 6 or more SCFM. In block 420, the applicator introduces sprout inhibitor into the air stream while moving the air in the first direction. In block 424, after a third time interval $T_3$ (e.g., after the remaining 25% of the total application time), the applicator stops the air mover. After block 424, the process ends.

In the embodiment of FIG. 4, the sprout inhibitor application process is broken down into three alternating stages. In other embodiments, however, sprout inhibitor can be applied to potatoes and other vegetables in more or fewer alternating stages without departing from the spirit or scope of the present disclosure. Furthermore, although the three stages of present embodiment extend for 25%, 50%, and 25% of the total application time, respectively, in other embodiments, the first, second, and third (or more) stages of application can extend for different portions of the total application time depending on various factors including, for example, layout of the storage facility, number of fans, type of sprout inhibitor, environmental conditions, etc.

Figure 5:
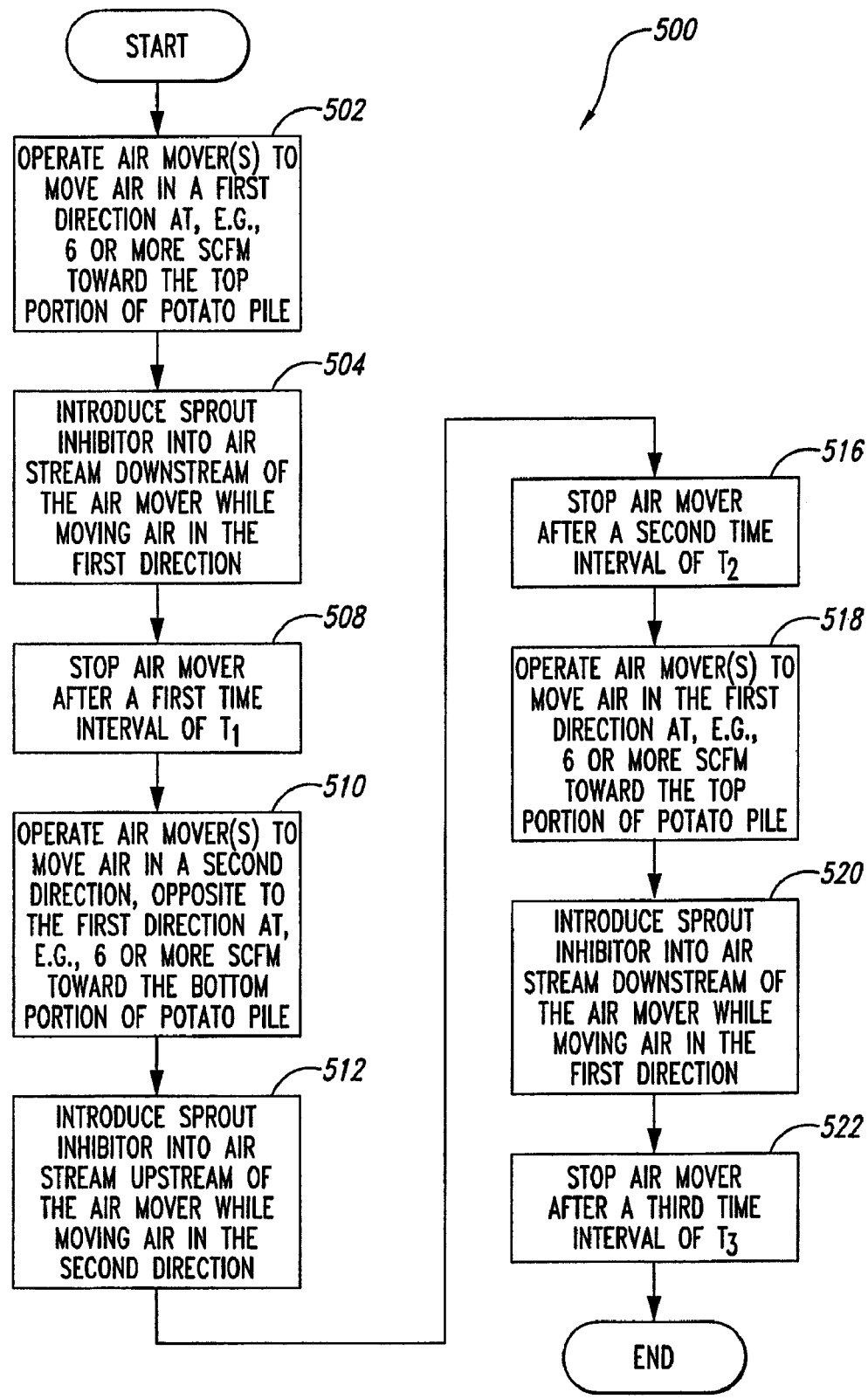
FIG. 5 is a flow diagram of yet another process for applying sprout inhibitor to potatoes and other post-harvest vegetables in a storage facility, in accordance with an additional embodiment of the invention.

FIG. 5 is a flow diagram of a process 500 for applying sprout inhibitor to post-harvest potatoes, onions, and other vegetables in accordance with yet another embodiment of the invention. As with the processes 300 and 400 described above, the process 500 can be implemented with an application system that is at least generally similar in structure and function to the application system 100 described above with reference to FIGS. 1 and 2. In block 502, the applicator operates the facility air mover or movers to drive the air stream in a first direction at, e.g., 6 or more SCFM toward the head space above a vegetable pile (e.g., a potato pile) in a storage facility. In block 504, the applicator introduces an aerosol of the sprout inhibitor into the air stream downstream of the air mover while moving the air in the first direction. In block 508, after a first interval of time $T_1$ (e.g., after about 15-35% of the total application time), the applicator stops the one or more air movers.

In block 510, the applicator reverses the direction of the air mover to move the air stream in a second direction, opposite to the first direction at, e.g., 6 or more SCFM toward the bottom portion of the potato pile. In block 512, the applicator introduces sprout inhibitor into the air stream upstream of the air mover while moving the air in the second direction. In block 516, after a second interval of time $T_2$ (e.g., after about 40-60% of the total application time), the applicator stops the one or more air movers.

In block 518, the applicator again reverses the direction of the air mover so that it again moves the air stream in the first direction at, e.g., 6 or more SCFM toward the top portion of the potato pile. In block 520, the applicator introduces the sprout inhibitor aerosol into the air stream downstream of the air mover while the air stream is moving in the first direction. In block 522, after a third interval of time $T_3$ (e.g., after about 15-35% of the total application time), the applicator stops the one or more air movers and the process ends.

FIG. 6 is a flow diagram of a process 600 for preparing and applying CIPC sprout inhibitor to potatoes and other stored vegetables, in accordance with an embodiment of the invention. Various portions of the process 600 can be carried out by a CIPC applicator. In block 602, the CIPC applicator liquefies solid CIPC. In one embodiment, this step can be carried out at the applicator's facility by applying heat to the solid CIPC in a melting tank. In block 604, the applicator combines clove oil (Biox-C), glycol, and/or other solvents with the liquid CIPC to form a CIPC mixture that remains liquid at temperatures less than 105° F., e.g., temperatures ranging from about 60° F. to about 75° F. In block 606, the applicator transports the liquid CIPC mixture to the vegetable (e.g., potato, onion, etc.) storage facility. In block 608, the applicator can apply an aerosol of the liquid CIPC mixture to the post-harvest vegetables using one of more of the application procedures described in detail above.

FIG. 7 is a flow diagram of a process 700 for preparing, transporting, and applying CIPC to potatoes and other stored vegetables, in accordance with another embodiment of the invention. As in the process 600 described above, various portions of the process 700 can be performed by a CIPC applicator. In block 702, the applicator heats solid CIPC in a melting tank to form liquid CIPC. In one embodiment, this step can be carried out at a suitable facility remote from the application job site. In block 704, the applicator combines clove oil, Biox-C, peppermint oil, eucalyptus oil, peanut oil, glycol, methanol, and/or other solvents with the liquid CIPC to form a liquid CIPC mixture that remains in solution at temperatures below 105° F. (e.g., temperatures ranging from about 50° F. to about 75° F.). In one embodiment, for example, at least 22% (e.g., about 23% or more) by weight of clove oil or other solvent can be added to the liquid CIPC in this step. In block 706, the applicator allows the liquid CIPC mixture to a cool. In block 708, the applicator transfers the liquid CIPC mixture from the melting tank to a suitable transport container on an over road trailer. In block 710, the applicator tows the trailer to the vegetable storage facility (i.e., the job site).

In block 712, after arriving at the job site, the applicator transfers a portion of the liquid CIPC mixture from the transport container on the trailer to a smaller, portable container. In block 714, the applicator transports the portable container to an aerosol-generating device positioned in flow communication with the storage facility. In block 716, the applicator turns the aerosol-generating device "on," and it begins drawing the CIPC mixture from the portable container, forming an aerosol of the CIPC mixture, and introducing the aerosol into the storage facility. In this particular embodiment, the aerosol-generating device can be an electric device that operates at temperatures less than 440° F. to introduce the CIPC aerosol into the vegetable storage facility. In other embodiments, however, other types of aerosol-generating devices (e.g., combustion devices) operating at other temperatures can be used to form the CIPC aerosol and pump it into the vegetable storage facility. After block 716, the process 700 ends.

From the foregoing, it will be appreciated that specific embodiments of the invention have been described herein for purposes of illustration, but that various modifications may be made without deviating from the spirit and scope of the various embodiments of the invention. For example, while much of the discussion above has focused on the use of CIPC with potatoes, the methods and systems described herein can also be used to apply CIPC and/or other types of sprout inhibitors to onions and/or other types of post-harvest crops. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

We claim:

1. A method of applying sprout inhibitor to a pile of harvested vegetables in a storage facility, the method comprising:
    forming an aerosol containing the sprout inhibitor;
    directing at least a first portion of the aerosol in a first direction into an area above the pile of vegetables to provide a substantially uniform distribution of the sprout inhibitor over the vegetables; and
    directing at least a second portion of the aerosol in a second direction into one or more ducts beneath the pile of vegetables to distribute the sprout inhibitor under the vegetables, wherein directing the first portion of the aerosol in the first direction includes operating a fan in a first direction, wherein directing the second portion of the aerosol in the second direction includes reversing the fan and operating the fan in a second direction, opposite to the first direction, and wherein at least one of directing the first portion of the aerosol in the first direction and directing the second portion of the aerosol in the second direction includes introducing the corresponding portion of the aerosol into the storage facility upstream of the fan.

2. The method of claim 1 wherein directing the second portion of aerosol in a second direction includes moving the second portion of aerosol through a fan at a flow rate of more than 6 SCFM.

3. The method of claim 1 wherein directing the first portion of aerosol in a first direction includes circulating the first portion of aerosol through the vegetables in a top-down direction, and wherein directing the second portion of aerosol in the second direction includes circulating the second portion of aerosol through the vegetables in a bottom-up direction.

4. The method of claim 1 wherein directing the first portion of aerosol in a first direction toward a top portion of the vegetables includes introducing the first portion of aerosol into the storage facility downstream of a fan.

5. The method of claim 1
    wherein directing the second portion of the aerosol in the second direction includes introducing the second portion of aerosol into the storage facility upstream of the fan.

6. The method of claim 1, further comprising:
    after directing the first portion of aerosol in the first direction and the second portion of aerosol in the second direction, forming a third portion of aerosol containing the sprout inhibitor; and
    directing the third portion of aerosol in the first direction into the area above the pile of vegetables.

7. The method of claim 1:
    wherein directing the first portion of aerosol in a first direction includes operating a fan in the first direction at a flow rate of more than 6 SCFM for a first period of time;
    wherein directing the second portion of aerosol in a second direction includes operating the fan in the second direction at a flow rate of more than 6 SCFM for a second period of time; and
    wherein the method further comprises:
        forming a third portion of aerosol containing the substance; and
        directing the third portion of aerosol in the first direction by operating the fan in the first direction at a flow rate of more than 6 SCFM for a third period of time.

8. The method of claim 1:
    wherein directing the first portion of aerosol in a first direction includes operating a fan in the first direction at a flow rate of more than 6 SCFM for a first period of time;
    wherein directing the second portion of aerosol in a second direction includes operating the fan in the second direction at a flow rate of more than 6 SCFM for a second period of time that is greater than the first period of time; and
    wherein the method further comprises:
        forming a third portion of aerosol containing the substance; and
        directing the third portion of aerosol in the first direction by operating the fan in the first direction at a flow rate of more than 6 SCFM for a third period of time that is less than the second period of time.

9. A method of applying sprout inhibitor to a pile of post-harvest potatoes in a storage facility, the method comprising:
    operating a fan to circulate air in the storage facility in a first direction;
    introducing a first portion of an aerosol containing the sprout inhibitor downstream of the fan in the storage facility while the air in the storage facility is circulating in the first direction, whereby the first portion of the aerosol flows into one of an area above the pile of potatoes or one or more ducts beneath the pile of potatoes;
    reversing the fan to circulate air in the storage facility in a second direction, opposite to the first direction; and
    introducing a second portion of the aerosol containing the sprout inhibitor upstream of the fan in the storage facility while the air in the storage facility is circulating in the second direction, whereby the second portion of the aerosol flows into the other of the area above the pile of potatoes or the one or more ducts beneath the pile of potatoes.

10. The method of claim 9:
    wherein operating a fan to circulate air in the storage facility in a first direction includes operating the fan at a flow rate of 6 SCFM or more; and
    wherein operating the fan to circulate air in the storage facility in a second direction includes operating the fan at a flow rate of 6 SCFM or more.

11. The method of claim 9:
wherein the first portion of aerosol flows toward a top portion of the pile of potatoes when the air in the facility is circulating in the first direction; and
wherein the second portion of aerosol flows toward a bottom portion of the pile of potatoes when the air in the facility is circulating in the second direction.

12. The method of claim 9 wherein introducing a first portion of an aerosol containing the sprout inhibitor into the storage facility includes introducing an aerosol of Isopropyl-N-chlorophenylcarbamate (CIPC) and clove oil into the storage facility.

13. The method of claim 9 wherein introducing a first portion of an aerosol containing the sprout inhibitor into the storage facility includes introducing an aerosol of a mixture that remains liquid at temperatures less than 105° F. into the storage facility.

14. The method of claim 9, further comprising:
melting Isopropyl-N-chlorophenylcarbamate (CIPC); and
mixing solvent with the melted CIPC to form a CIPC solution that remains liquid at temperatures ranging from about 60° F. to about 75° F., wherein introducing a first portion of an aerosol containing the sprout inhibitor into the storage facility includes introducing a first portion of an aerosol formed with the CIPC solution into the storage facility.

15. The method of claim 9, further comprising:
melting Isopropyl-N-chlorophenylcarbamate (CIPC); and
mixing clove oil with the melted CIPC to form a CIPC solution, wherein introducing a first portion of an aerosol containing the sprout inhibitor into the storage facility includes introducing a first portion of an aerosol formed with the CIPC solution into the storage facility.

16. The method of claim 9, further comprising:
melting Isopropyl-N-chlorophenylcarbamate (CIPC);
mixing solvent with the melted CIPC to form a CIPC solution that remains liquid at temperatures below 105° F.; and
transporting the CIPC solution to the storage facility, wherein introducing a first portion of an aerosol containing the sprout inhibitor into the storage facility includes introducing a first portion of an aerosol formed with the CIPC solution into the storage facility.

17. A method of applying sprout inhibitor to a pile of potatoes in a storage facility, the method comprising:
introducing a first portion of an aerosol containing the sprout inhibitor into the storage facility;
operating a fan in a first direction at a flow rate of 5 SCFM or more to move the first portion of aerosol into a head space above the pile of potatoes to provide a substantially uniform distribution of the sprout inhibitor over the potatoes;
introducing a second portion of the aerosol containing the sprout inhibitor into the storage facility; and
operating the fan in a second direction, opposite to the first direction, at a flow rate of 5 SCFM or more to circulate the aerosol in the storage facility through one or more ducts beneath the pile of potatoes and up through the pile of potatoes;
wherein introducing at least one of the first portion of the aerosol and the second portion of the aerosol into the storage facility includes introducing the corresponding portion of the aerosol into the storage facility upstream of the fan.

18. The method of claim 17:
wherein introducing a first portion of an aerosol containing the sprout inhibitor into the storage facility includes introducing the first portion of aerosol into a fan room separated from a supply air plenum by a facility wall that supports the fan; and
wherein operating the fan in a second direction at a flow rate of 5 SCFM or more includes operating the fan to move the aerosol from the fan room and into the supply air plenum.

19. A system for applying sprout inhibitor to harvested vegetables in a storage facility, the system comprising:
means for forming an aerosol containing the sprout inhibitor;
means for directing a first portion of the aerosol in a first direction into a head space above a top portion of the vegetables to distribute the sprout inhibitor over the vegetables; and
means for directing a second portion of the aerosol in a second direction into one or more ducts beneath a bottom portion of the vegetables to distribute the sprout inhibitor under the vegetables;
wherein at least one of the means for directing the first portion of the aerosol and the means for directing the second portion of the aerosol include means for introducing the corresponding portion of the aerosol upstream of a fan and flowing the corresponding portion of the aerosol through the fan.

20. The system of claim 19 wherein means for directing the second portion of aerosol in a second direction includes means for moving air through a fan in the storage facility at a flow rate of 5 SCFM or more.

21. The system of claim 19:
wherein the means for directing the first portion of aerosol in a first direction includes means for circulating the first portion of aerosol through the vegetables in a top-down direction; and
wherein the means for directing the second portion of aerosol in the second direction includes circulating the second portion of aerosol through the vegetables in a bottom-up direction.

22. The system of claim 19 wherein the means for forming a first portion of aerosol containing the sprout inhibitor includes means for forming an aerosol of a mixture of Isopropyl-N-chlorophenylcarbamate (CIPC) and solvent that remains liquid at temperatures below 105° F.

23. A method of applying a sprout inhibitor to a pile of harvested produce in a storage facility, the method comprising:
providing a first portion of an aerosol containing the sprout inhibitor;
operating a fan in a first direction to move the first portion of aerosol into a head space above the pile of harvested produce and provide a substantially uniform distribution of the sprout inhibitor over the produce;
providing a second portion of the aerosol containing the sprout inhibitor; and
reversing the fan to operate the fan in a second direction, opposite to the first direction, to move the second portion of aerosol into one or more ducts beneath the pile of harvested produce and distribute the sprout inhibitor under the produce;
wherein at least one of providing the first portion of the aerosol and providing the second portion of the aerosol includes providing the corresponding portion of the aerosol upstream of the fan.

24. The method of claim 23 wherein operating the fan in the first direction circulates the first portion of aerosol through the pile of harvested produce in a top-down direction, and wherein operating the fan in the second direction circulates the second portion of aerosol through the pile of harvested produce in a bottom-up direction.

25. The method of claim 23 wherein providing a first portion of an aerosol includes introducing the first portion of aerosol downstream of the fan, and wherein providing a second portion of the aerosol includes introducing the second portion of aerosol upstream of the fan.

* * * * *